United States Patent
Brandstätter

(10) Patent No.: US 6,807,678 B2
(45) Date of Patent: Oct. 19, 2004

(54) METHOD FOR SELECTIVELY TRANSMITTING SCREEN CONTROL DATA FOR TERMINAL DISPLAYS FROM A SERVER TO A CLIENT COMPUTER

(75) Inventor: Klaus Brandstätter, Rosstal (DE)

(73) Assignee: HOB GmbH & Co. KG, Zirndorf (DE)

( * ) Notice: Subject to any disclaimer, the term of this patent is extended or adjusted under 35 U.S.C. 154(b) by 659 days.

(21) Appl. No.: 09/805,475

(22) Filed: Mar. 14, 2001

(65) Prior Publication Data

US 2002/0133538 A1 Sep. 19, 2002

(51) Int. Cl.[7] .................................................. G06T 1/60
(52) U.S. Cl. ...................... 725/146; 345/204; 345/418; 345/537; 345/544
(58) Field of Search ............................... 709/217, 218, 709/219; 725/146; 345/10, 11, 24, 204, 418, 537, 544

(56) References Cited

U.S. PATENT DOCUMENTS 5,781,228 A * 7/1998 Sposato ........................ 725/32
6,061,056 A * 5/2000 Menard et al. ............. 345/704

FOREIGN PATENT DOCUMENTS

JP        2003130650 A  *  5/2003

* cited by examiner

Primary Examiner—B. James Peikari
(74) Attorney, Agent, or Firm—Browdy and Neimark, P.L.L.C.

(57) ABSTRACT

A method for selecting and transmitting selected screen control data for screen displays of a terminal from a server to a client computer uses a first and second screen content array memory each comprising screen cells representing a given screen display. By selectively comparing the contents of the screen cells in the first and second screen content array memory an efficient transmission of selected screen control data from the server to a client computer is achieved.

7 Claims, 17 Drawing Sheets

Grid 200:

|   | A | B | C | D | E | F | G | H |
|---|---|---|---|---|---|---|---|---|
| 1 | A | B | C | C | C | A | A | A |
| 2 | B | B | B | C | B | C | C | C |
| 3 | D | D | D | D | A | B | A | B |
| 4 | A | C | D | D | D | C | C | D |
| 5 | C | D | D | D | D | B | C | B |
| 6 | B | A | A | A | A | C | B | C |
| 7 | B | D | A | A | D | D | A | B |
| 8 | C | D | A | B | D | C | D | C |

(210 points to cell at column G, row 8: A)

Grid 100:

|   | A | B | C | D | E | F | G | H |
|---|---|---|---|---|---|---|---|---|
| 1 | A | B | C | D | D | A | A | A |
| 2 | B | B | B | C | D | C | C | C |
| 3 | D | D | D | D | A | B | A | B |
| 4 | A | A | D | D | D | C | C | C |
| 5 | C | D | D | D | D | B | B | B |
| 6 | B | A | A | A | A | C | B | C |
| 7 | B | D | A | D | A | D | A | B |
| 8 | C | D | B | B | D | C | D | C |

(110 highlights cell at column C, row 8: B)

Figure 17

METHOD FOR SELECTIVELY TRANSMITTING SCREEN CONTROL DATA FOR TERMINAL DISPLAYS FROM A SERVER TO A CLIENT COMPUTER

BACKGROUND OF THE INVENTION

1. Field of the Invention

The invention relates to a method for selecting and transmitting selected screen control data for screen displays of a terminal from a server to a client computer.

Such a method is relevant for so-called client-server applications in computer networks. The server application is generating screen control data for screen displays to be visualized on the client terminal. In this connection "terminal" means a terminal per se or a so-called terminal emulation. The screen control data are transmitted by a defined data exchange protocol, like for terminals of the type 3270, the emulation products of the type 5250, both of IBM Corp., or for a terminal of the type VT220 of Digital Equipment Corporation, the ICA (Independent Computer Architecture) or RDP (Remote Desktop Protocol) protocols to the client, where the client computer displays the screen content.

In general the volume of data to be transmitted between the server and the client is an important matter because the bandwidth of the transmission channels is limited and the costs for the data transmission is depending on the volume of data.

2. Background Art

In a known concept of screen display control in client-server applications, the screen display is made up of a plurality of screen cells. The screen of a terminal has a certain number of screen cells, which are commonly arranged in columns and rows. The screen cells are stored in a one-dimensional array memory which serves e.g. for refreshing the screen content.

Depending on the type of application the type of screen cell may be a character, according to e.g. a so-called EBCDIC-code, ASCII-code or others, which may be combined with an attribute, like bold, underline, blinking, color, etc. Both these types of characters are appropriate for character-based terminals and terminal emulations like for the 3270, 5250 or VT 220 protocol. For graphic terminals or terminal emulations, in which the client uses rather an ICA or RDP protocol, a screen cell is a pixel, which may be encoded by e.g. 8 bits, 16 bits (high color) or 24 bits (true color).

It is well known to provide for a so-called selective transmission which in general reduces the volume of data to be transferred. The basic principle of this selective transmission is the fact that when changing the screen display the server only transmits these screen cells, which have actually changed. The transmission is normally started with header data, which include the position on screen to start and the length of the data. In other cases like when working with a 3270 protocol a part of the screen is sent after positioning the courser on a certain screen position. From this screen start position consecutive screen cells are sent.

This selective transmission shows the problem that on the one hand the server compares the screen cells of a first screen content array memory with all the screen cells of a second screen array memory to verify which screen cells have changed and thus have to be transmitted from the server to the client computer. This requires a certain computing capacity and computing time at the server. On the other hand the common practice to send the relevantly changed screen cells with header data or the curser positioning data leads to inefficient data transmission in case only a single or few screen cells were changed and are sent to the client.

SUMMARY OF THE INVENTION

It is an object of the invention to provide a method for selecting and transmitting selected screen control data for screen displays of a terminal from a server to a client computer which method is more efficient compared to prior art selective transmission. Significantly, the detecting and selecting of the changed screen cells should be optimized.

This object is achieved by a method for selecting and transmitting selected screen control data which include the steps of providing for a plurality of screen cells making up the screen display;

storing the contents of the screen cells representing a first given screen display into a first screen content array memory of the server;

storing the contents of the screen cells representing a second given screen display into a second screen content array memory of the server;

comparing the contents of each screen cell of the first screen content array memory to the contents of each according screen cell of the second screen content array memory starting from the first screen cell until screen cells with different contents are detected, which screen cells define an array start position;

comparing the contents of each screen cell of the first screen content array memory to the contents of each according screen cell of the second screen content array memory starting from the last screen cell until screen cells with different contents are detected, which screen cells define an array end position;

dividing the first and second screen array memories into fields of a given number of screen cells between the array start position and the array end position;

comparing the contents of selected fields of the first array memory to according fields of the second array memory cell by cell starting from a low field after the array start position;

detecting a first end field in which all cells in both the compared fields are equal;

comparing the contents of each screen cell of first screen content array memory to the contents of each according screen cell of the second screen content array memory starting from one cell below the end field and going back in the direction of the array start position until screen cells with non-matching contents are detected, which cells define a transmission end position;

transmitting screen cells of one of first and second screen content array memory between the array start position and transmission end position to client computer;

comparing the contents of each screen cell of first screen content array memory to the contents of each according screen cell of second screen content array memory starting from above the end field until screen cells with different contents are detected which screen cells define a new array start position; and repeating the aforesaid steps until a new array start position reaches the array end position.

As an advantage of the invention it is possible to save data volume and transmission time in a server-client computer system, as in a so-called "selective transmission of screen content"; only these screen cells are sent, the data contents of which have changed when a new screen display has been generated by a server application.

The essential features and benefits of the inventions and preferred embodiments will become apparent from the enclosed description of a preferred embodiment taken in conjunction with the drawing.

BRIEF DESCRIPTION OF THE DRAWINGS

FIGS. 1 through 17 show diagrammatic representations of a screen proxy with first and second screen content array memories each comprising a plurality of screen cells.

DESCRIPTION OF THE PREFERRED EMBODIMENT

Figure 1:
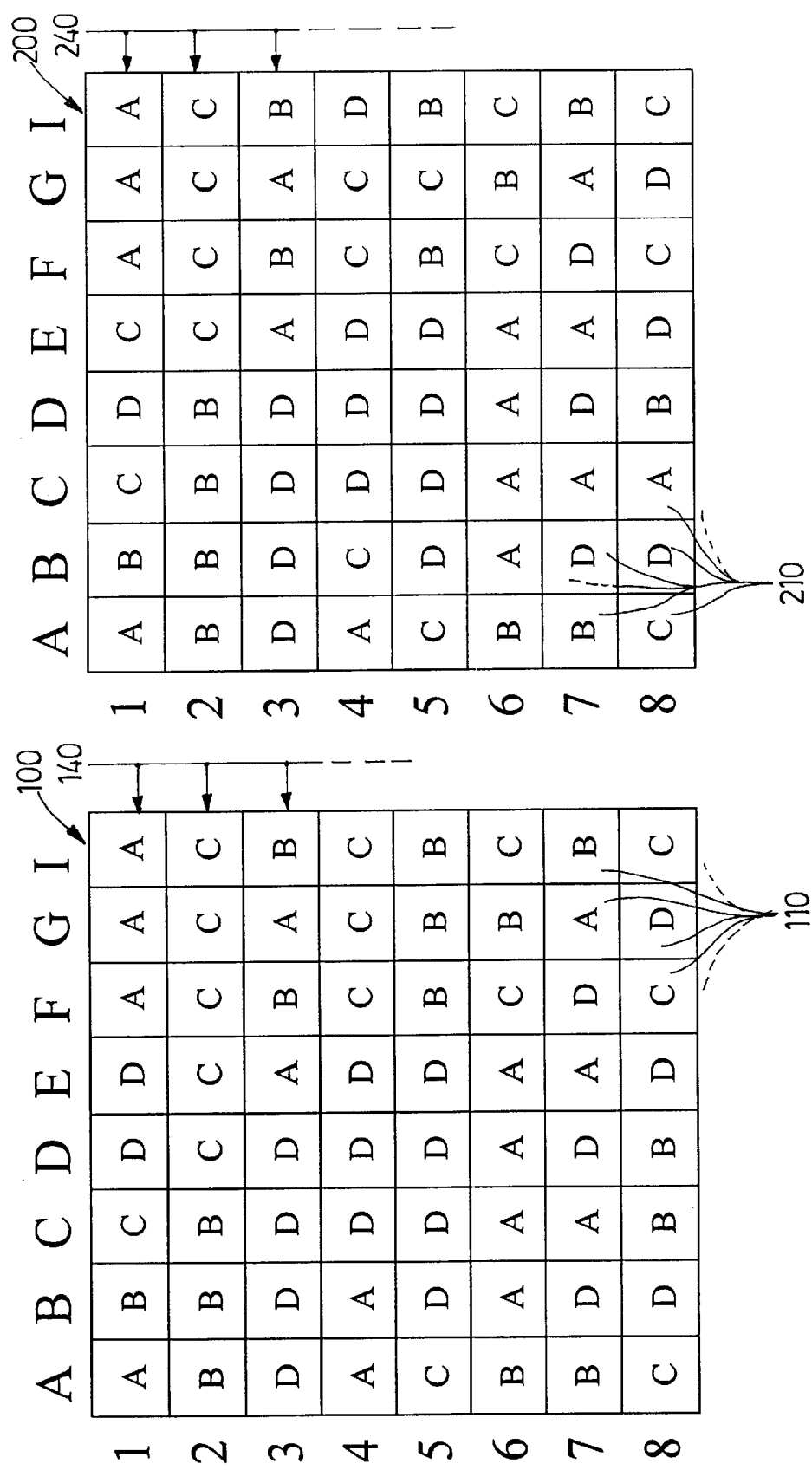

Before turning to the actual method according to the invention some basic background information about the transmission of screen control data between server and client computers are to be given. Accordingly a server application sends data to some kind of software within the server control, which software is provided with a gateway functionality. This software is referred to as "screen-proxy" in the technical terminology. Now the screen-proxy has a connection to the client and is responsible for packing the screen control data representing a certain screen content into a well-defined protocol and sending the data to the client terminal for displaying. A protocol like TCP/IP or SNA is used for the transmission of the data.

At any given time the screen-proxy 10 (FIG. 1 through 17) is provided with a so-called screen content array memory in which all the screen cells making up a certain screen display are stored. Such a screen content array memory 100 is diagrammatically shown on the left-hand side of the screen proxy 10 in each of the drawing FIGS. 1 through 17.

According to prior art systems, the screen content array memory 100 is first updated when the server application generates new screen content e.g. by API or by transmission. Then the screen cells, in total referred to as 110, are sent to the client for displaying. The single screen cells are to be denoted like the fields on a chess board, i.e. A1, B1 . . . G8, I8, in the model like screen content array memory 100.

The screen cells 110 transmitted to the client computer include the necessary screen control data to make up the screen display encoded in the screen cells and to show the according screen display on the terminal. Any time the screen-proxy 10 sends the screen cells 110 to the client computer the according screen display can be shown on the client terminal. This may take place after e.g. an interruption and restart of the transmission line between the screen-proxy 10 and the client or after an amended screen display has been transmitted to the client.

As already mentioned above it is possible to save data volume and transmission time by only sending these screen cells the data contents of which has changed when a new screen display was generated by the server application. For this sake the screen-proxy 10 initiates a second screen content array memory 200 in the same size as first screen array memory and copies the content of first screen content array memory 100 to the second screen content array memory 200, by copying the contents of each screen cell 110 to each screen cell 210 of second memory 200. Afterwards the screen-proxy 10 updates screen content array memory 100 using the new actual data from the server application.

The procedural situation after this copying and actualizing is visualized in FIG. 1: in the first screen content array memory 100 screen control data represented by the literals A, B, C and D, together making up a certain new screen display, are contained in the screen cells 110 and thus stored in the memory 100. In the second screen content array memory 200 screen control data A, B, C, D making up the former screen display are stored in the screen cells 210. As can be seen by comparing memories 100 and 200 in most positions, e.g. A1, B1, A3 through D3 etc. identical screen control data are stored whereas in some positions non-matching data are included, e.g. in screen cells C1, I4, C8 etc.

Whereas in Prior Art the screen-proxy 10 compared the whole contents of "new" screen content array memory 100 to the "old" screen content array memory 200 now the invention teaches an alternative procedure which is explained in the following.

Figure 2:
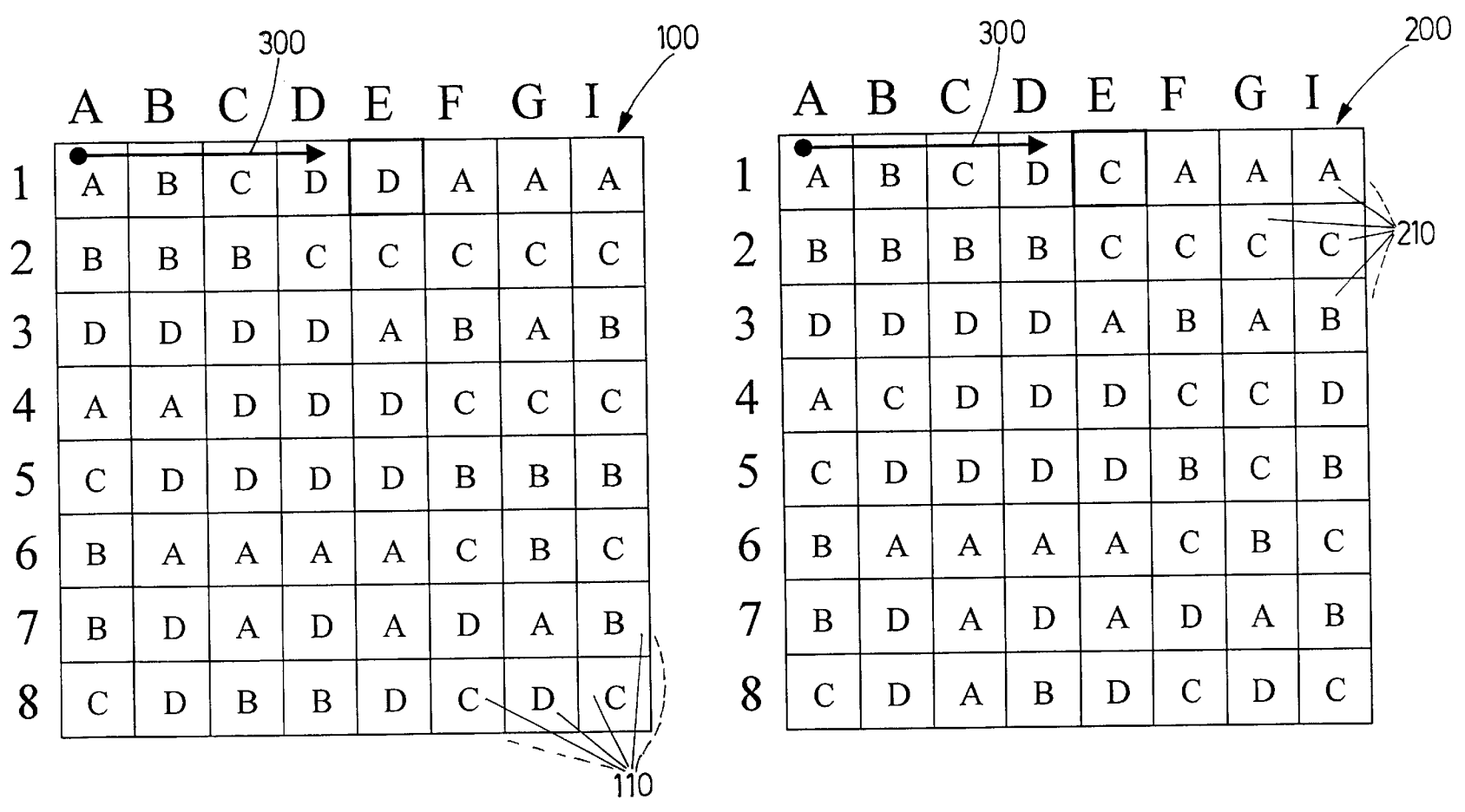

Starting with the situation represented in FIG. 1 the contents of each screen cell 110 of first screen content array memory 100 is compared to the according screen cells 210 of the second screen content array memory 200 starting from the first screen cell A1. This comparison is made stepwise until screen cells with different contents are detected. In FIG. 2 this scanning operation is represented by arrow 300 starting from screen cells A1 and terminating at screen cells E1 which define the array start position E1.

Figure 3:
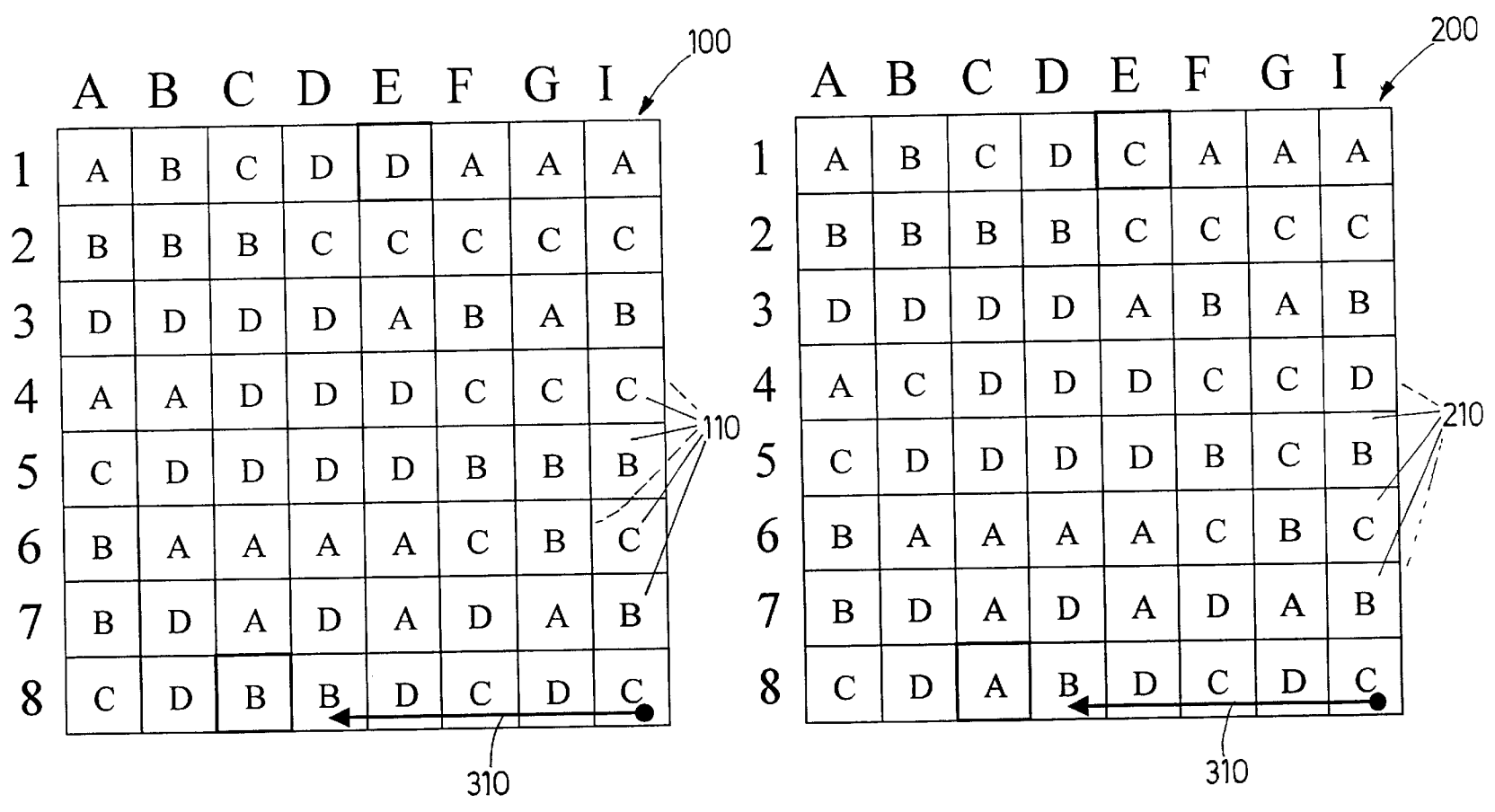

Afterwards the contents of each screen cell 110 of the first screen content array memory 100 is compared to the contents of each according screen cell 210 of the second screen content array memory 200 starting from the last screen cells I8 and going downward. This is represented by scanning arrow 310 starting from the screen cells I8 and terminating at screen cells C8, which have different contents. By this detection the screen cells 110, 210 on position C8 define an array end position C8 (FIG. 3).

Afterwards, the first and second screen array memories 100, 200 are divided into fields 120. Each field 120, 220 comprises—as given number—four screen cells 110, 210. As can be seen from FIG. 4 both memories 100, 200 are divided into 14 fields 120, 220 being numbered as 1 through 14 in the drawing and—if necessary—referred to in this description as field 120.1, 120.2 . . . 120.14, 220.1 . . . 220.14. The last fields 120.14 and 220.14 comprise the remaining three screen cells 110, 210 instead of the four screen cells 110, 210 of the remaining fields 120, 220.

In the next step the screen-proxy 10 compares the contents of selected fields 120 of the first array memory 100 to according fields 220 of the second memory 200 cell by cell. This method step starts from the lowest field 120.2, 220.2 following the fields 120.1, 220.1 including the array start position E1. Further on—and as will be clear later-on—the screen-proxy 10 only selects every second fields for this comparing step, i.e. starting from fields 120.2, 220.2 the fields 120.4, 220.4, 120.6, 220.6 are scanned.

Figure 4:
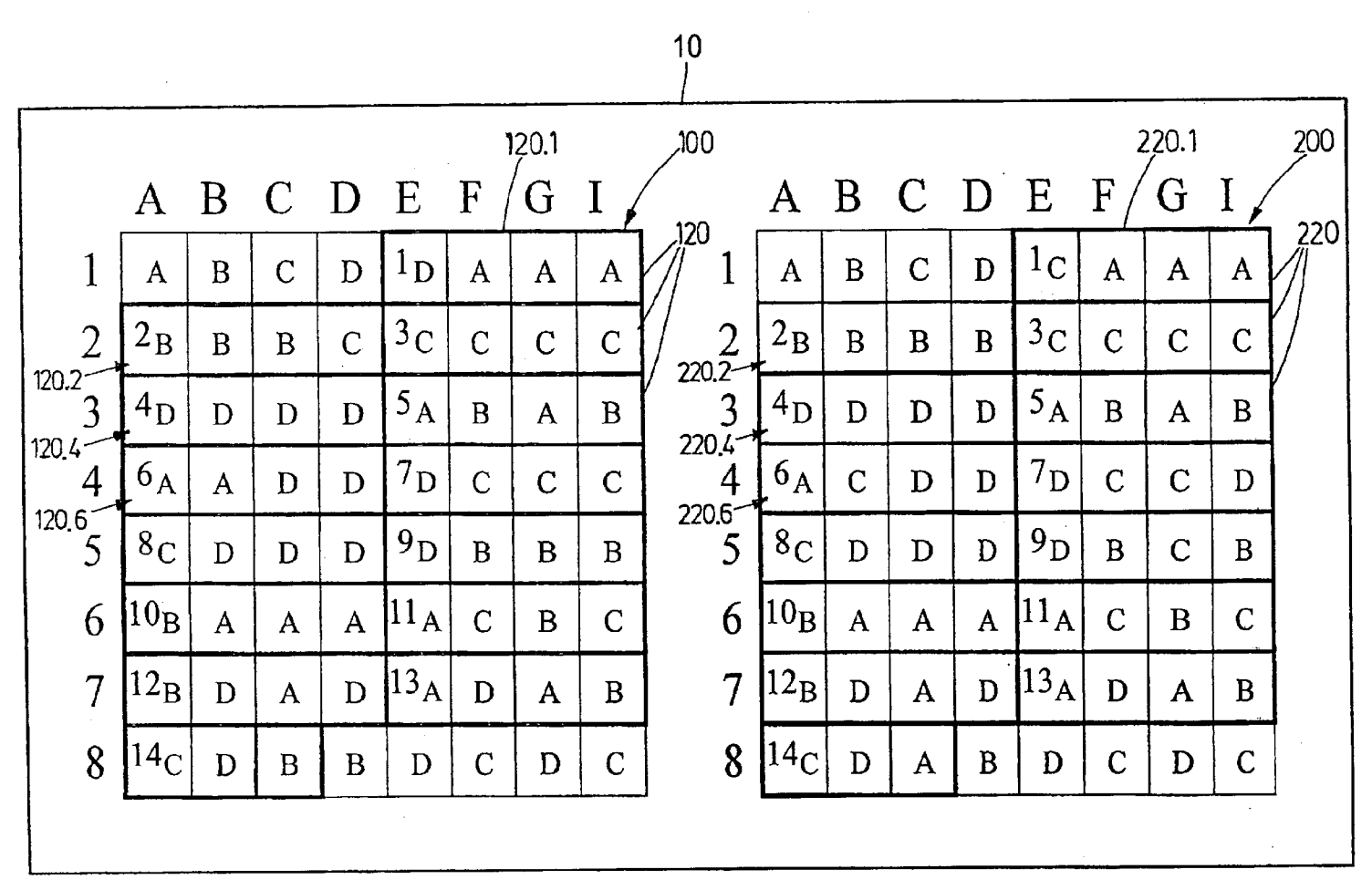

As can be seen from FIG. 4 within this comparing steps a first end field 120.4, 220.4 is detected, in which all according screen cells 110, 210 in the positions A3, B3, C3 and D3 are equal. The end fields 120.4, 220.4 are bold-framed in FIG. 6.

In the next step the screen-proxy 10 starts from one screen cell 110, 210 below the end fields 120.4, 220.4, i.e. from position I2, and compares the contents of each screen cell 110 of first screen content array memory 100 to the contents of the according screen cell 210 of the second screen content array memory going back in the direction of the array start position. This is represented by the scanning arrow 320 in FIG. 7. With this method step screen cells 110, 210 in position D2 are detected, which have non-matching contents. These cells define a transmission end position D2.

In the next step the screen cells 110 of the screen content array memory 100 between the array start position E1 and the transmission end position D2 are transmitted to the client computer. The according screen cells 110 are provided with a bold frame in FIG. 8.

To search a new array start position for the next partial transmission of the screen content array memory 100 each screen cell 110 of the first screen content array memory 100 is compared to each according screen cell 210 of the second screen content array memory 200 starting from the first position above the end field 120.4, 220.4, i.e. from position E3. The memories 100, 200 are thus scanned until screen cells 110, 210 are detected in position B4 with different contents. This scanning action is represented by scanning arrow 330 in FIG. 9. The new start array position is B4.

Starting from this new array start position B4 again both screen content array memories 100, 200 are divided into fields 120.1–120.9 and 220.1–220.9 up to the array end position C8. The last field 120.9, 220.9 has two screen cells as elements, whereas the remaining fields again include four screen cells (see FIG. 10).

Figure 5:
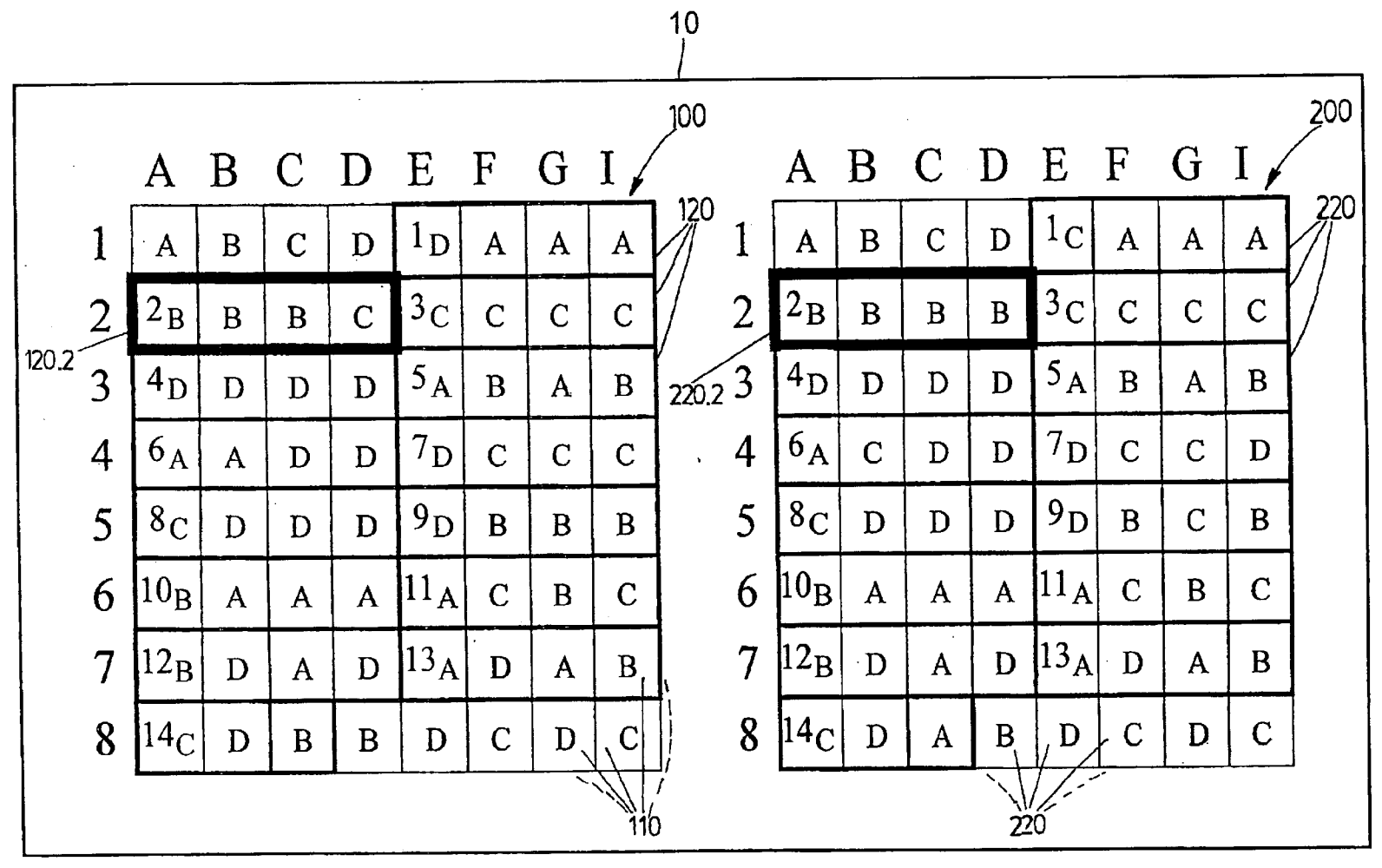
Figure 6:
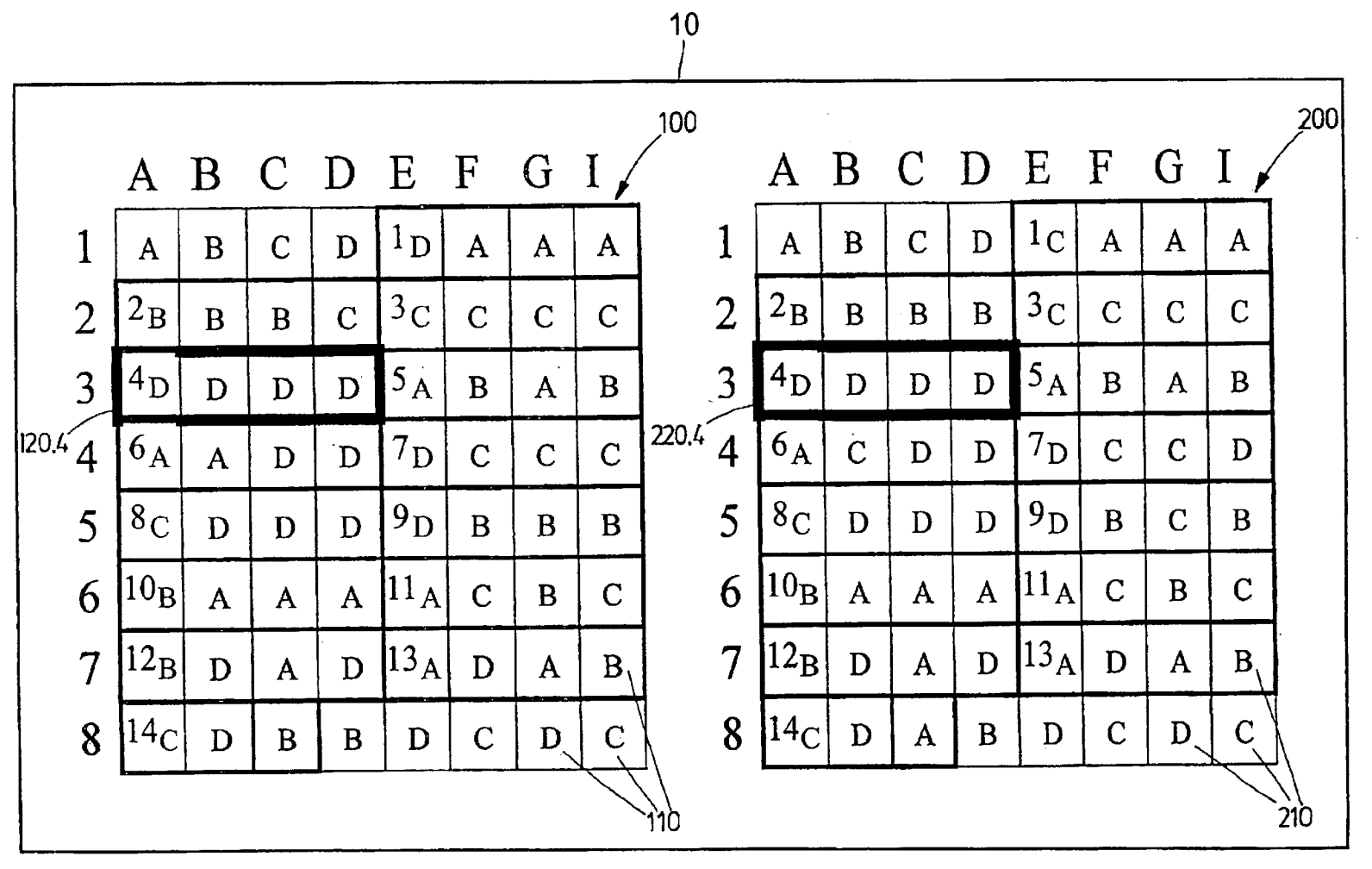
Figure 7:
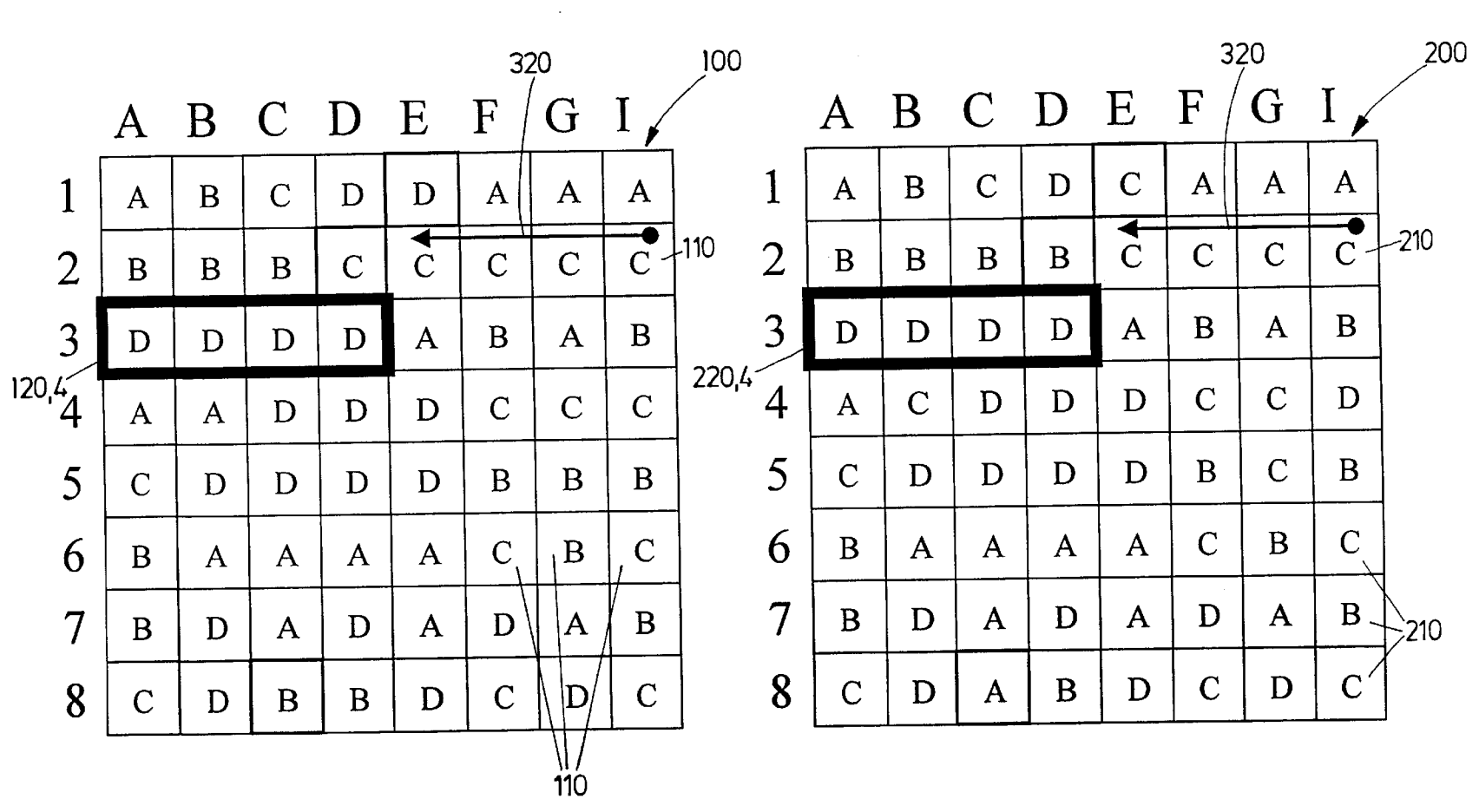
Figure 11:
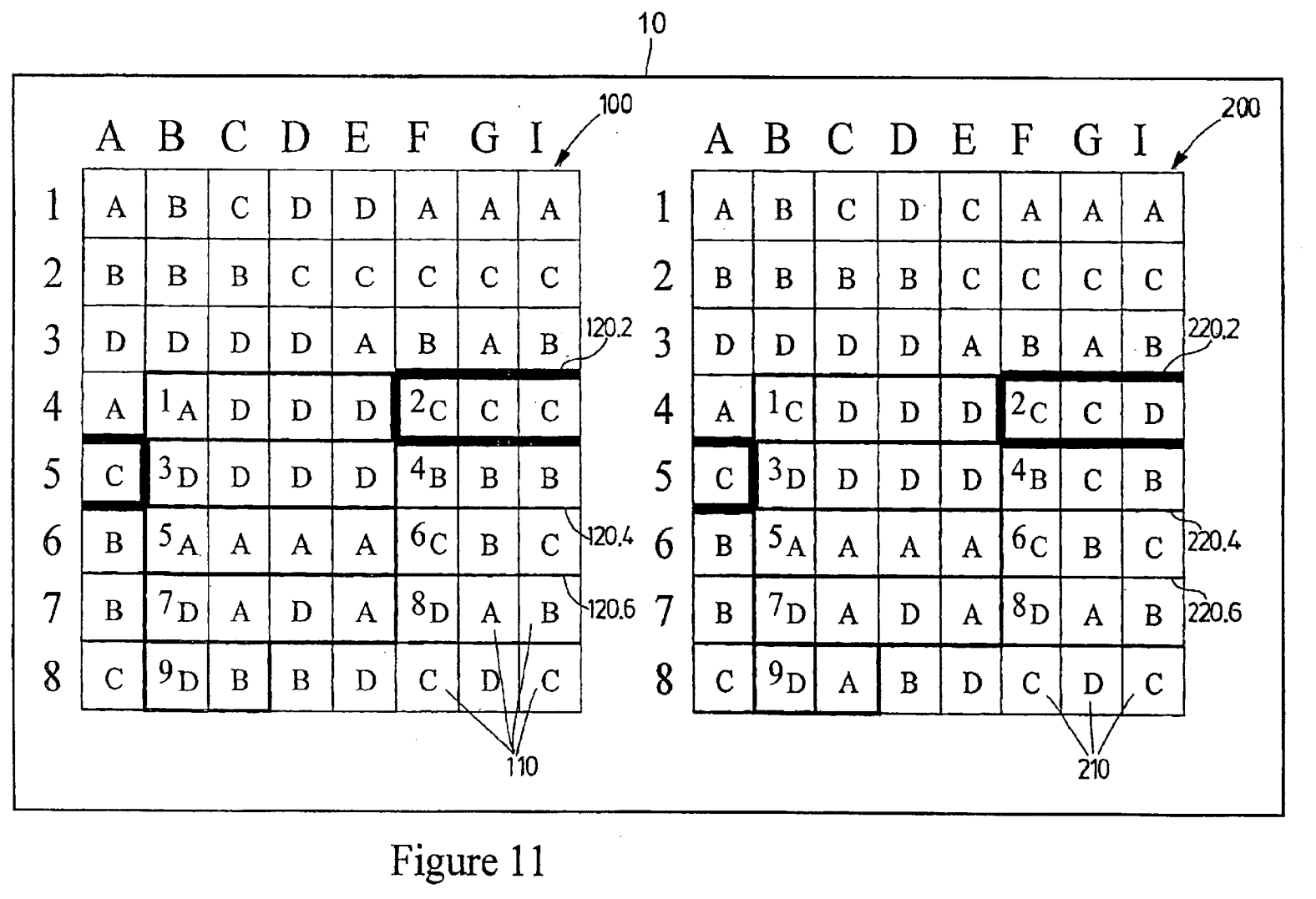
Figure 12:
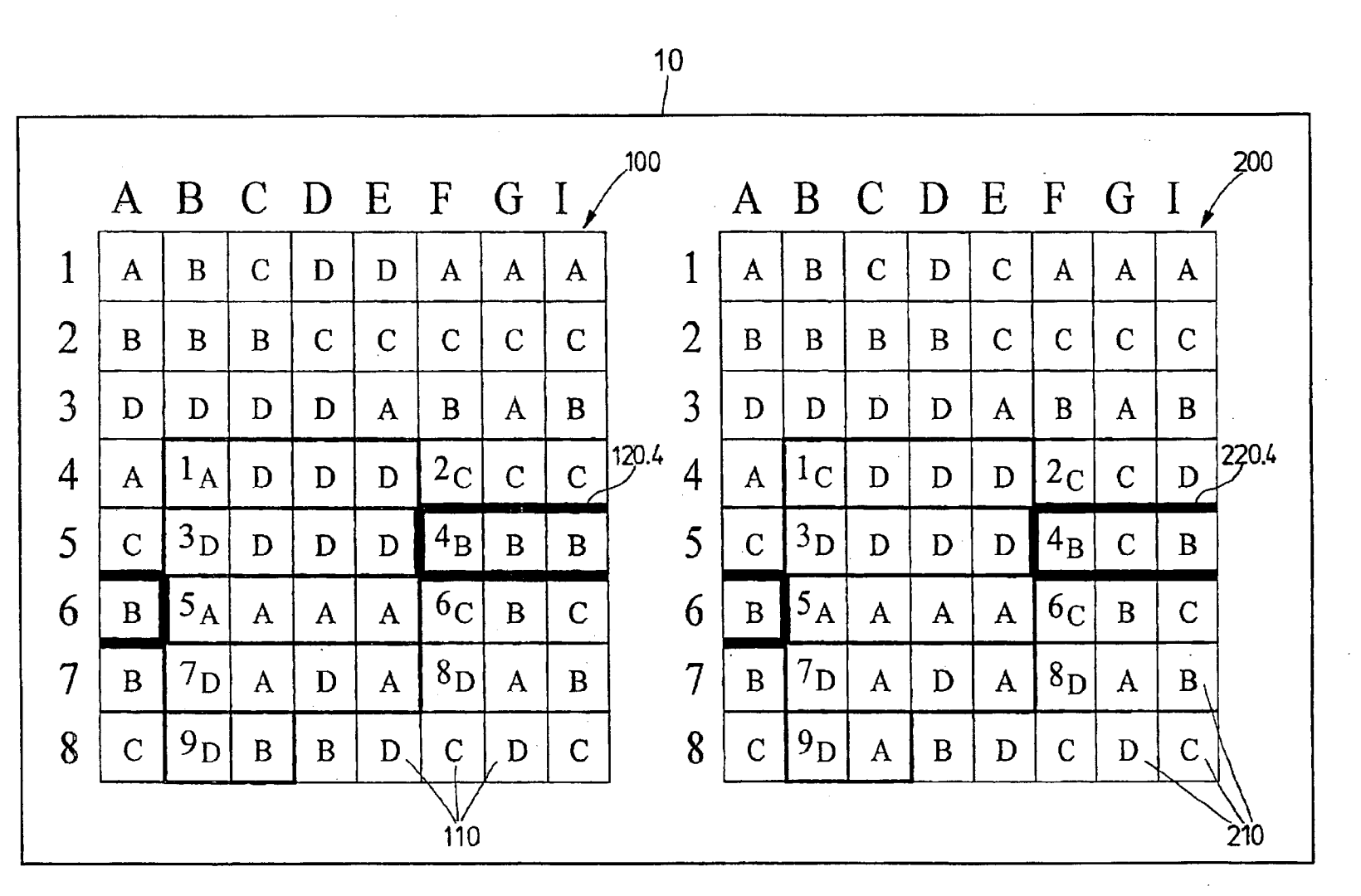
Figure 13:
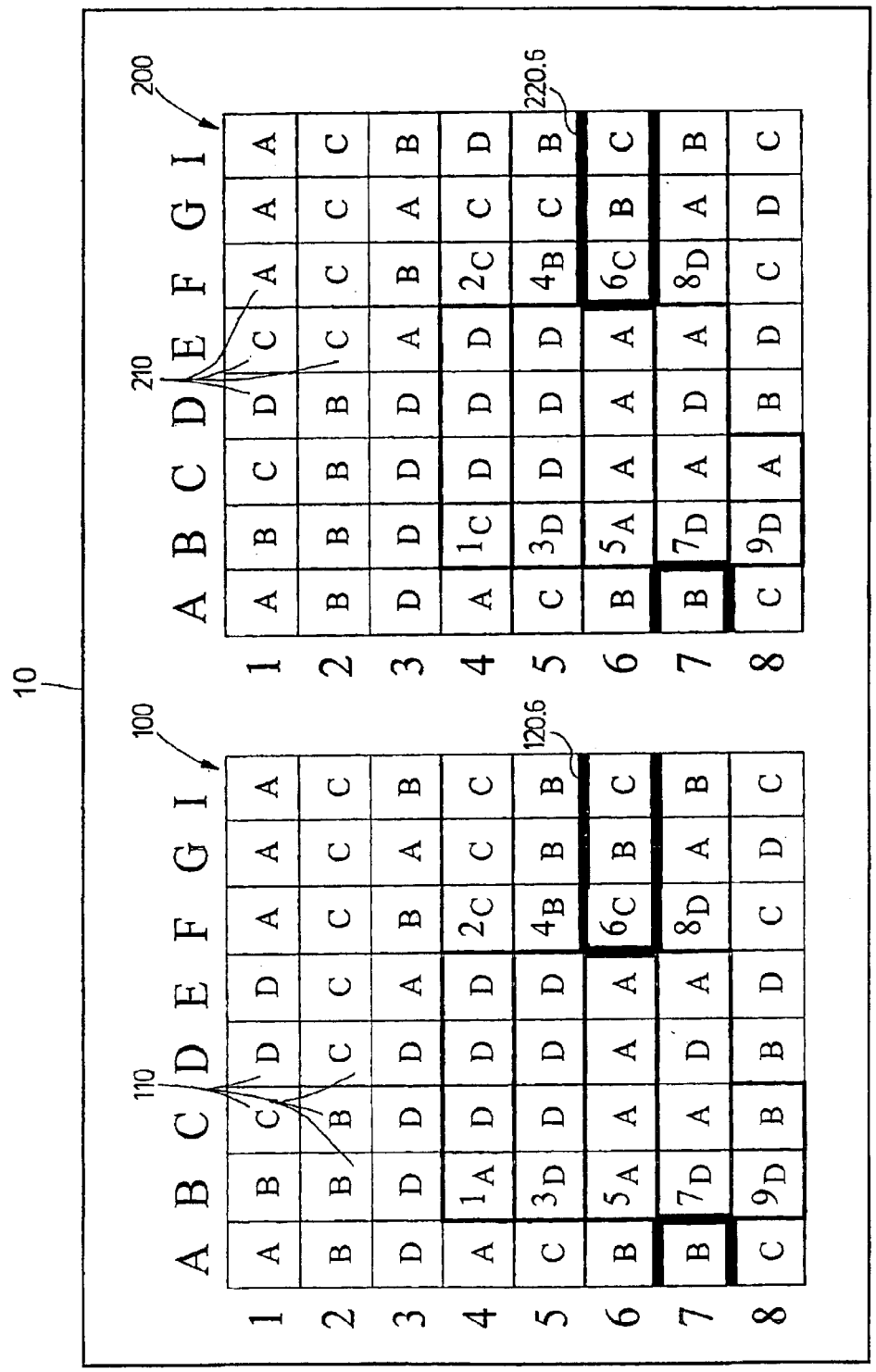

Afterwards, in repeating the steps explained in accordance with FIG. 5 through 7 each second field 120.2, 220.2, 120.4, 220.4 and 120.6, 220.6 are compared with each other cell by cell until in field 120.6, 220.6 all screen cells 110, 210 are detected to be equal (see bold frames in FIG. 11 through 13).

Figure 14:
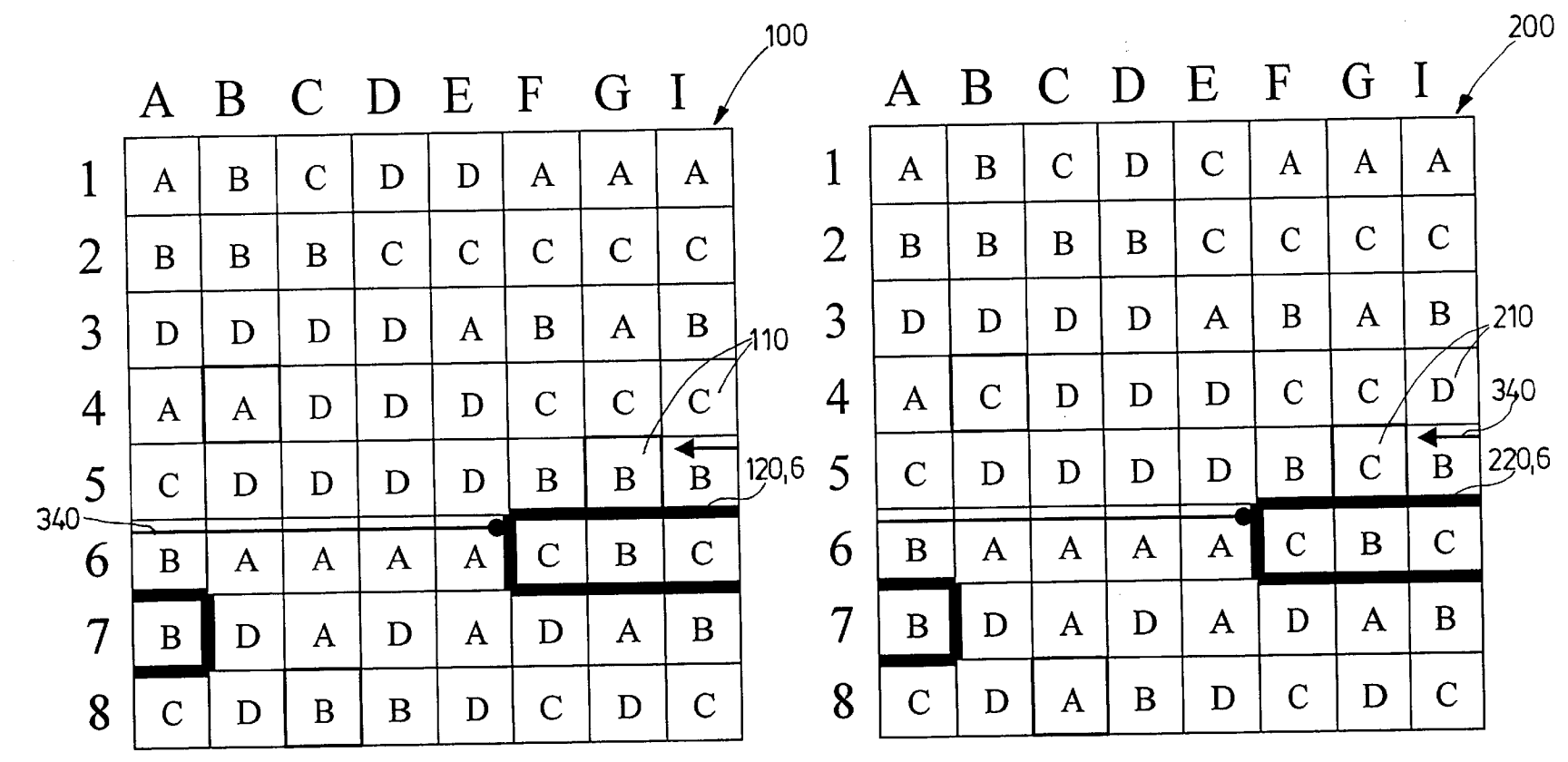

In the next step depicted in FIG. 14 and in accordance with the method step explained and shown in FIG. 7 the screen cells 110, 210 from one cell below that end field 120.6, 220.6 are checked in the direction of the array start position whether or not according screen cells 110, 210 have identical or non-matching contents. By this scan, which is visualized by the scan arrow 340 in FIG. 14 a new transmission end position is selected represented by screen cell 110, 210 in position G5.

Figure 15:
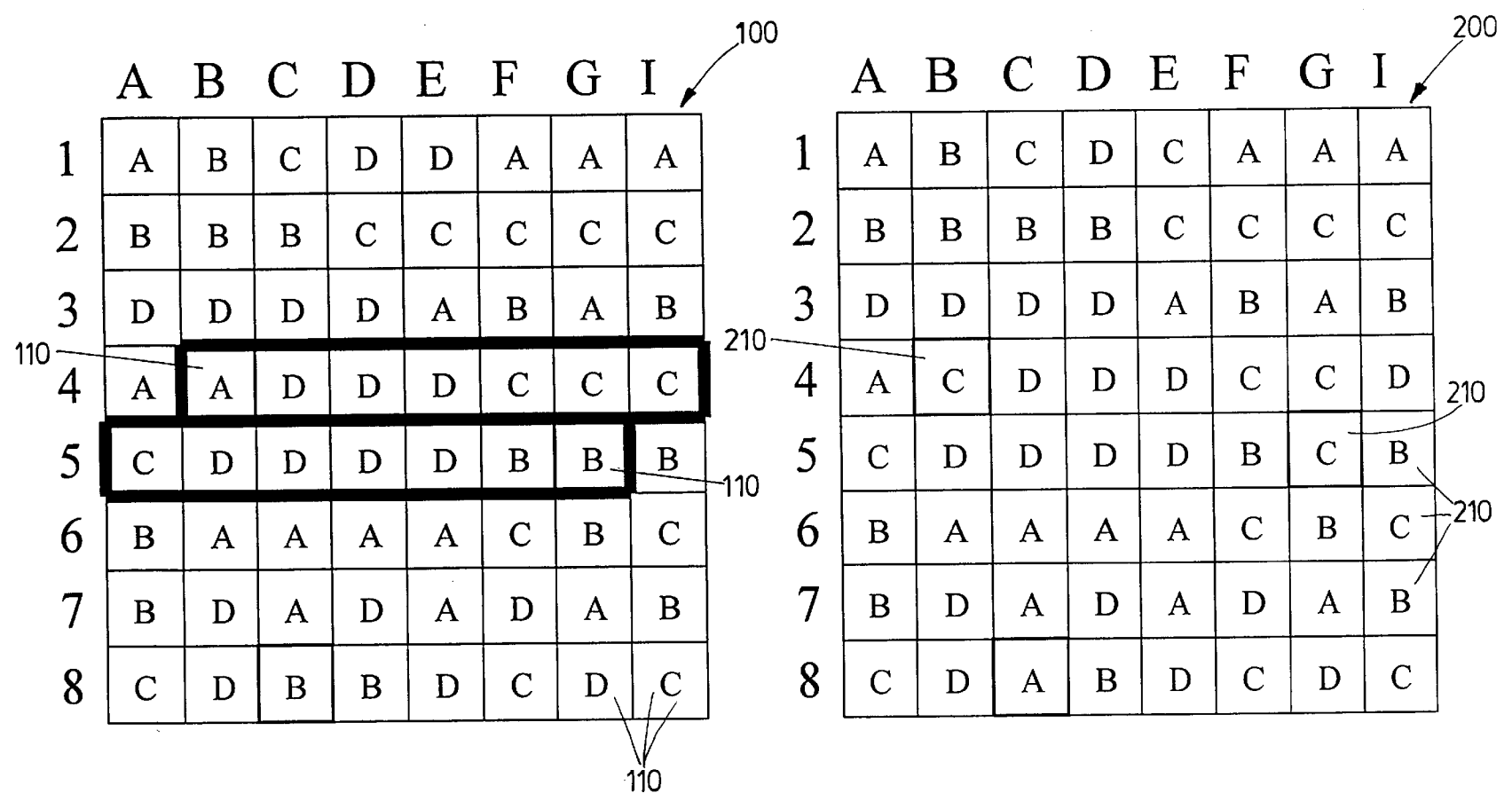

In the next step the screen cells 110, 210 between new array start position B4 and new transmission end position G5 are transmitted from the server to the client computer (see bold frame in FIG. 15).

Finally starting from above the end field 120.6, 220.6, i.e. in position B7 the remaining screen cells are compared to each other to find a possible new array start position. This is represented by scanning arrow 350 in FIG. 16. As, however, all screen cells in this interval between position B7 and B8 have an identical contents the comparing step terminates in reaching the array end position C8, indicating that the screen cell in position C8 is the last one which is different between both screen content array memories 100, 200, i.e. the contents of this screen cell of screen content array memory 100 is to be transmitted to the client computer (see FIG. 17).

Finally attention is drawn to the fact that some protocols like the HOB-Y-protocol of the applicant contain commands to be sent from the server to the client to move or copy one part of the screen to another part of the screen. The most common example for such a function is the scrolling of the screen in upward or downward direction.

Such scrolling is normally done in full rows of screen cells. Accordingly a preferred embodiment of the invention provides for an efficient data handling in connection with scrolling. Actually the screen-proxy 10 does not only compare screen content array memory 100 with corresponding screen cells 210 of screen content array memory 200, but also searches for "scrolled" screen cells. This means that the screen display is divided up into rows 140, 240 of screen cells, which are represented in those screen content array memories 100, 200 of FIG. 1. Now the contents of screen cells 110 of the first screen content array memory 100 is compared to the contents of screen cells 210 of the second screen content array memory 200 in screen cell positions, which are displaced versa the according screen cell position of the first screen content array memory 100 by at least one row 140, 240 of screen cells 110, 210. By this "displaced comparison" one can easily detect displaced rows 140, 240 of screen cells identifying scrolled screen displays. If the screen-proxy 10 finds that such scrolling has been done, it may send commands to the client to move or copy the screen content to certain positions instead of sending screen cells.

What is claimed is:

1. A method for selecting and transmitting selected screen control data for screen displays of a terminal from a server to a client computer comprising the steps of
   A. providing for a plurality of screen cells making up the screen display,
   B. storing the contents of the screen cells representing a first given screen display into a first screen content array memory of the server,
   C. storing the contents of the screen cells representing a second given screen display into a second screen content array memory of the server,
   D. comparing the contents of each screen cell of first screen content array memory to the contents of each according screen cell of second screen content array memory starting from the first screen cell until screen cells with different contents are detected, which screen cells define an array start position,
   E. comparing the contents of each screen cell of first screen content array memory to the contents of each according screen cell of second screen content array memory starting from the last screen cell until screen cells with different contents are detected which screen cells define an array end position,
   F. dividing first and second screen array memories into fields of a given number of cells between array start position and array end position,
   G. comparing the contents of selected fields of the first screen content array memory to according fields of the second screen content array memory cell by cell starting from a low field after array start position,
   H. detecting a first end field in which all screen cells in both the compared fields are equal,
   I. comparing the contents of each screen cell of first screen content array memory to the contents of each according screen cell of second screen content array memory starting from one cell below said end field and going back in the direction of the array start position until screen cells with non-matching contents are detected, which cells define a transmission end position,
   J. transmitting screen cells of first screen content array memory between array start position and transmission end position to client computer,
   K. comparing the contents of each screen cell of first screen content array memory to the contents of each according screen cell of second screen content array memory starting from above the end field until screen cells with different contents are detected which screen cells define a new array start position, and
   L. repeating steps F. through K. until new array start position reaches array end position.

2. A method according to claim 1 wherein case of a character based terminal a screen cell is represented by a character.

3. A method according to claim 1 wherein case of a character based terminal a screen cell is represented by a character and a character attribute.

4. A method according to claim 1 wherein in case of a graphic terminal a screen cell is represented by a pixel of the terminal.

5. A method according to claim 1 wherein each field of the first and second screen array memory comprises one of 2, 4, 8 or 16 screen cells.

6. A method according to claim 1 wherein every second field of the first screen content array memory is compared to the according field of the second screen content array memory.

7. A method according to claim 1 wherein the screen display is divided into of screen cells and wherein the contents of screen cells of the first screen content array memory is compared to the contents of screen cells of the second screen content array memory in screen cell positions which are displaced versa the according screen cell position of the first screen content array memory by at least one row of screen cells.

* * * * *